United States Patent
Yoshiya

(10) Patent No.: US 10,612,942 B2
(45) Date of Patent: Apr. 7, 2020

(54) DISPLACEMENT DETECTING DEVICE AND CONTINUOUSLY VARIABLE TRANSMISSION DEVICE

(71) Applicants: MELEXIS TECHNOLOGIES NV, Tessenderlo (BE); K. K. MELEXIS JAPAN TECHNICAL RESEARCH CENTER, Yokohama-shi, Kanagawa (JP)

(72) Inventor: Takumi Yoshiya, Yokohama (JP)

(73) Assignee: MELEXIS TECHNOLOGIES SA, Bevaix (CH)

( * ) Notice: Subject to any disclaimer, the term of this patent is extended or adjusted under 35 U.S.C. 154(b) by 95 days.

(21) Appl. No.: 15/757,257

(22) PCT Filed: Sep. 5, 2016

(86) PCT No.: PCT/JP2016/075919
§ 371 (c)(1),
(2) Date: Mar. 2, 2018

(87) PCT Pub. No.: WO2017/056854
PCT Pub. Date: Apr. 6, 2017

(65) Prior Publication Data
US 2018/0274944 A1    Sep. 27, 2018

(30) Foreign Application Priority Data
Sep. 28, 2015 (JP) ................................. 2015-189669

(51) Int. Cl.
*G01B 7/14* (2006.01)
*G01D 5/14* (2006.01)
(Continued)

(52) U.S. Cl.
CPC .............. *G01D 5/145* (2013.01); *F16H 9/08* (2013.01); *F16H 59/68* (2013.01); *G01B 7/003* (2013.01);
(Continued)

(58) Field of Classification Search
CPC ........ G01D 5/145; G01D 5/147; G01D 5/202; G01D 5/206; G01D 5/225; G01D 5/2208;
(Continued)

(56) References Cited

U.S. PATENT DOCUMENTS 5,315,244 A * 5/1994 Griebeler ............ F15B 15/2846
324/207.13
6,218,829 B1 * 4/2001 Wittenstein ............ G01B 7/003
324/207.21
(Continued)

FOREIGN PATENT DOCUMENTS

CN    100514000 C    7/2009
CN    102395813 A    3/2012
(Continued)

OTHER PUBLICATIONS

The International Search Report for PCT/JP2016/075919 dated Dec. 6, 2016.
(Continued)

*Primary Examiner* — Thang X Le
(74) *Attorney, Agent, or Firm* — Hauptman Ham, LLP

(57) ABSTRACT

To provide a displacement detection device and a continuously variable transmission that directly detect the position of the movable sheave. A displacement detection device includes a magnet that forms a magnetic field, a movable sheave that is rotated in a rotational direction and displaced in a direction perpendicular to the rotational direction and that is a measuring object having a concave portion (or a protrusion) on the circumferential surface, and a sensor
(Continued)

disposed between the magnet and the circumferential surface of the movable sheave and detecting a change in magnetic flux density due to the displacement of the movable sheave in the magnetic field formed by the magnet and induced to the concave portion (or the protrusion).

4 Claims, 14 Drawing Sheets

(51) Int. Cl.
      *G01B 7/00*     (2006.01)
      *F16H 9/08*     (2006.01)
      *F16H 59/68*    (2006.01)
      *F16H 61/662*   (2006.01)

(52) U.S. Cl.
      CPC ............... *G01B 7/14* (2013.01); *G01D 5/147* (2013.01); *F16H 61/662* (2013.01)

(58) Field of Classification Search
      CPC .. G01D 5/12; G01D 5/14; G01D 5/16; G01D 5/2457; G01D 5/2013; G01D 5/2046; G01B 7/30; G01B 7/003; G01B 7/14
      See application file for complete search history.

(56) References Cited

U.S. PATENT DOCUMENTS

| | | | |
|---|---|---|---|
| 7,242,180 B1 | 7/2007 | O'Connor | |
| 8,535,186 B2 * | 9/2013 | Asaoka | F16H 61/66259 474/28 |
| 2008/0074104 A1 * | 3/2008 | Sauer | G01D 5/145 324/207.22 |
| 2011/0313719 A1 * | 12/2011 | Yamaguchi | F16H 9/18 702/150 |
| 2013/0271118 A1 | 10/2013 | Mizutani et al. | |
| 2015/0176962 A1 * | 6/2015 | Kerdraon | G01B 7/14 324/207.24 |

FOREIGN PATENT DOCUMENTS

| | | |
|---|---|---|
| EP | 1855116 A2 | 11/2007 |
| JP | 2010-223252 A | 10/2010 |
| JP | 2010-249263 A | 11/2010 |
| JP | 2010249263 A | 11/2010 |
| JP | 2014-196780 A | 10/2014 |
| WO | 2010119748 A1 | 10/2010 |

OTHER PUBLICATIONS

A European Search Report with Search Opinion issued to the corresponding European application No. 16851030.3 dated May 28, 2019.
A Chinese Office Action issued to the corresponding Chinese application No. 201680059224.7 dated Aug. 16, 2019.
A Japanese Office Action issued to the corresponding Japanese application No. 2015-189669 dated Apr. 19, 2019.

* cited by examiner

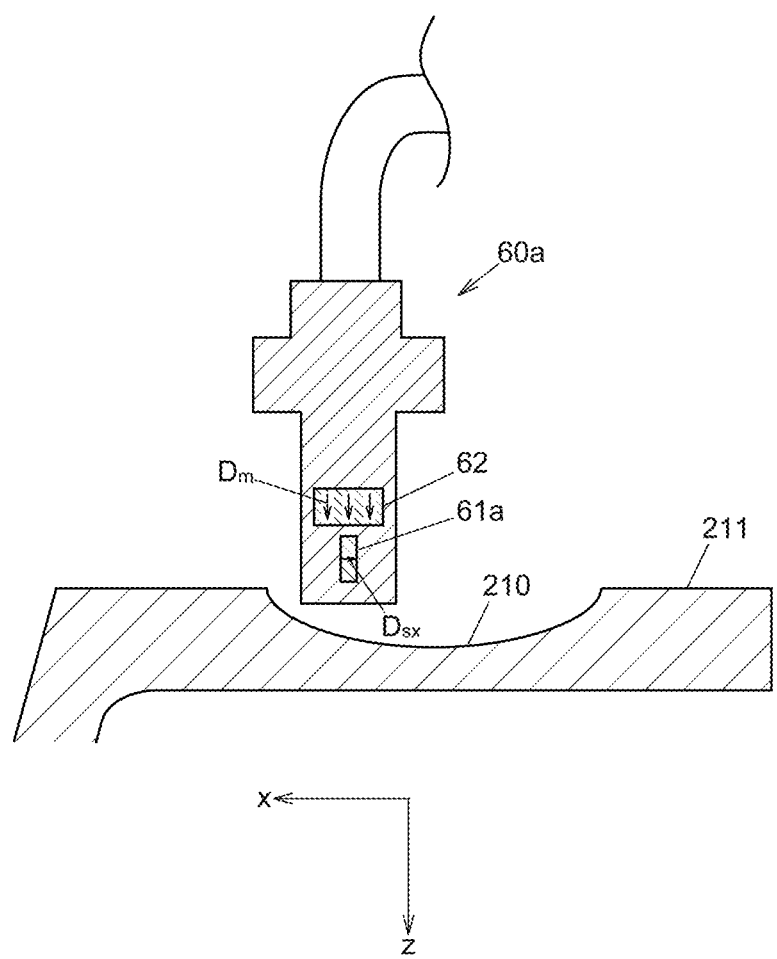

DISPLACEMENT DETECTING DEVICE AND CONTINUOUSLY VARIABLE TRANSMISSION DEVICE

CROSS REFERENCE TO RELATED APPLICATION

This application claims the priority of Japanese Patent Application No. 2015-189669filed on Sep. 28, 2015, in the JPO (Japanese Patent Office). Further, this application is the National Phase application of International Application No. PCT/JP2016/075919 filed Sep. 5, 2016, which designates the United States and was published in Japan. The priority documents are hereby incorporated by reference in their entireties.

TECHNICAL FIELD

The present invention relates to a displacement detection device and a continuously variable transmission.

BACKGROUND ART

As a conventional technique, a continuously variable transmission has been proposed in which an actuator for moving a movable sheave and a sensor for detecting the position of the movable sheave are configured to be separated from each other (for example, refer to Patent Literature 1.)

The continuously variable transmission disclosed in Patent Literature 1 has an actuator for moving the movable sheave and a sensor for detecting the position of the movable sheave, which are disposed as separate bodies and the actuator moves the movable sheave via an arm, and then the sensor detects the position of the movable sheave by detecting the position of the arm.

CITATION LIST

Patent Literature

Patent Literature 1: JP 2014-196780 A

SUMMARY OF INVENTION

Technical Problem

However, in the continuously variable transmission disclosed in Patent Literature 1, the influence of dimensional errors and assembly errors of each of elements arranged from the sensor to the movable sheave is small, and the position of the movable sheave can be accurately detected as compared with a case where the actuator and the sensor are integrated to detect the protrusion amount of the rod of the actuator, but still the position of the movable sheave is not directly detected, and thus there is a problem that the accuracy is limited.

Accordingly, an object of the present invention is to provide a displacement detection device and a continuously variable transmission that directly detect the position of the movable sheave.

Solution to Problem

In order to achieve the above object, one embodiment of the present invention provides the following displacement detection device and continuously variable transmission.

[1] A displacement detection device including:
a magnet for forming a magnetic field;
a measuring object that is rotated in a rotational direction and displaced in a direction perpendicular to the rotational direction and has a concave portion or a protrusion on a circumferential surface; and
a sensor that is disposed between the magnet and the circumferential surface of the measuring object and that detects a change in magnetic flux density due to displacement of the measuring object in the magnetic field formed by the magnet and induced to the concave portion or the protrusion of the measuring object.

[2] The displacement detection device according to the item [1], wherein a width of the concave portion or the protrusion in a direction in which the measuring object is displaced is substantially equal to an amount of the displacement.

[3] A continuously variable transmission including:
a magnet for forming a magnetic field;
a movable sheave having a concave portion or a protrusion on a circumferential surface; and
a sensor that is disposed between the magnet and the circumferential surface of the movable sheave and that detects a change in magnetic flux density due to displacement of the measuring object in the magnetic field formed by the magnet and induced to the concave portion or the protrusion.

[4] A displacement detection device including:
a magnet for forming a magnetic field; and
a sensor that is disposed between a concave portion or a protrusion formed on a circumferential surface of a measuring object which is rotated in a rotational direction and displaced in a direction perpendicular to the rotational direction and the magnet, and that detects a change in magnetic flux density due to displacement of the measuring object in the magnetic field formed by the magnet and induced to the concave portion or the protrusion of the measuring object.

Advantageous Effects of Invention

According to the invention according to claim 1, 3 or 4, the position of the movable sheave can be directly detected.

According to the invention according to claim 2, the position of the movable sheave can be directly detected within the range of the displacement amount of the measuring object.

BRIEF DESCRIPTION OF DRAWINGS

FIG. 11 is a cross-sectional view showing a modification example of the configuration of the displacement detection device.

DESCRIPTION OF EMBODIMENTS

[Embodiment]
(Configuration of Continuously Variable Transmission)

Figure 1:
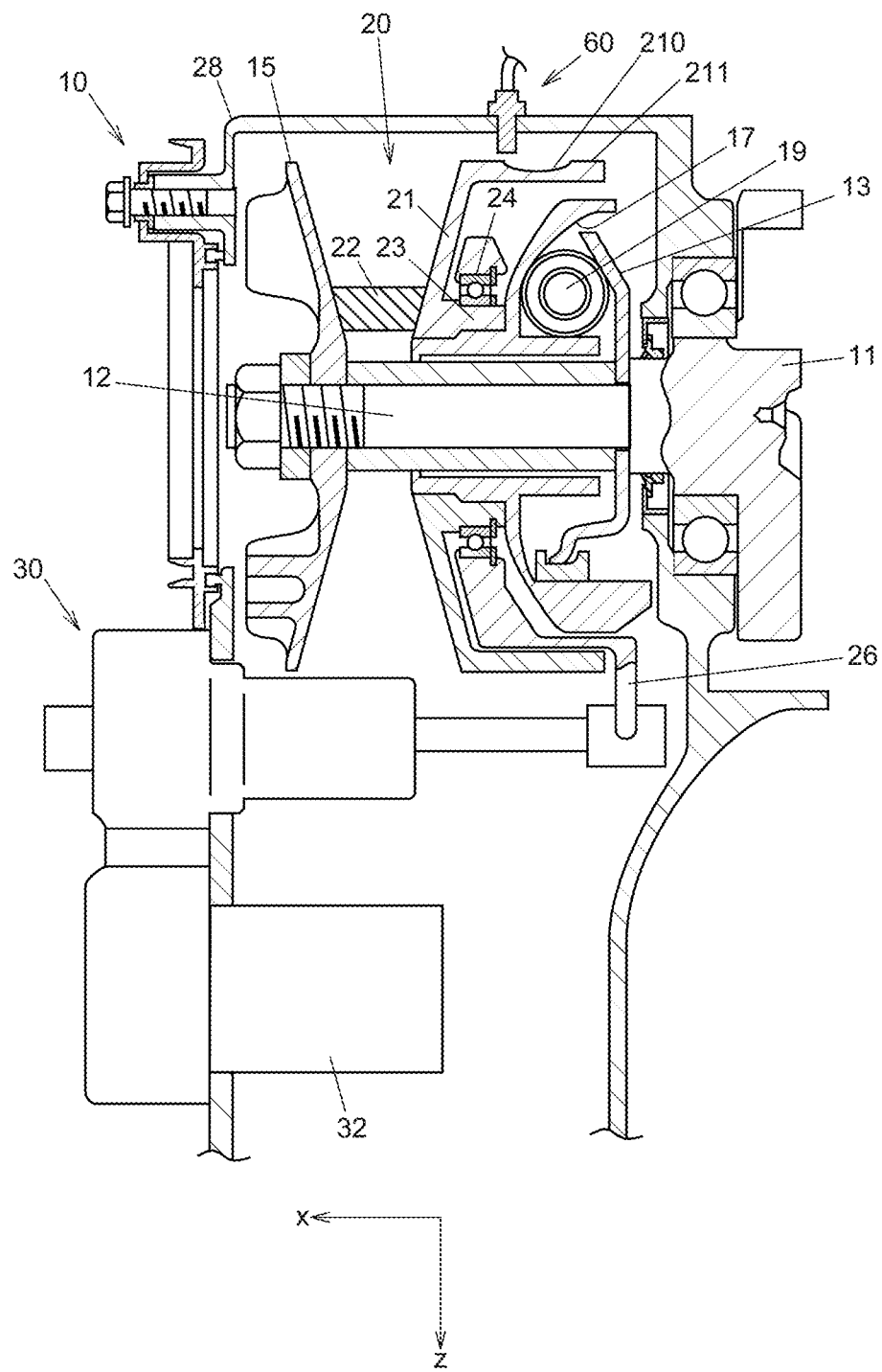
FIG. 1 is a partial cross-sectional view showing a configuration example of a continuously variable transmission according to an embodiment.
Figure 2:
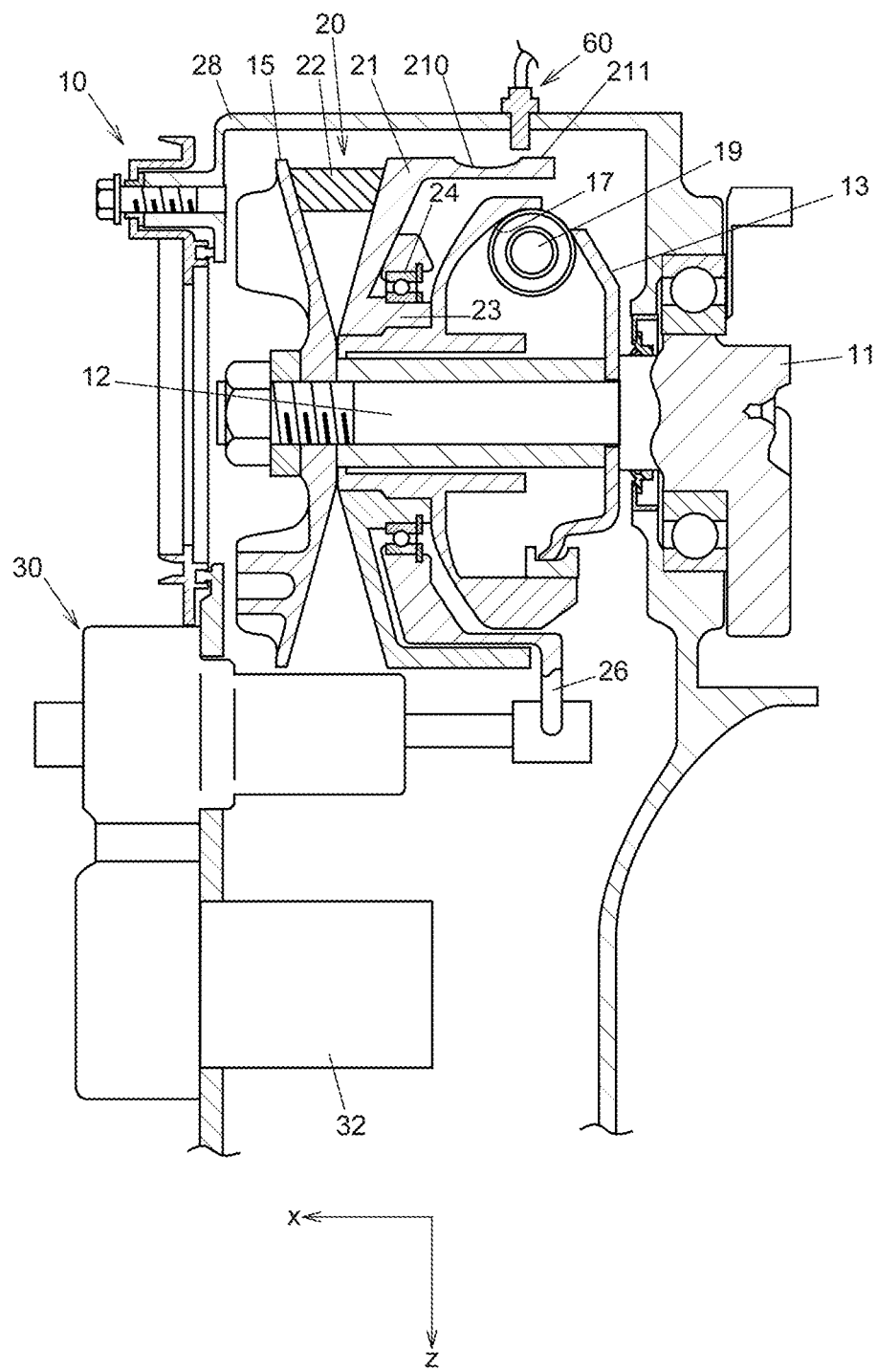
FIG. 2 is a partial cross-sectional view showing a configuration example of a displacement detection device and the continuously variable transmission when a movable sheave has moved.

FIG. 1 is a partial cross-sectional view showing a configuration example of a displacement detection device and a continuously variable transmission according to an embodiment. FIG. 2 is a partial cross-sectional view showing a configuration example of the displacement detection device and the continuously variable transmission when a movable sheave has moved. The vertically downward direction in FIGS. 1 and 2 is defined as a z-axis direction, the horizontally leftward direction is defined as an x-axis direction, and the near side direction is defined as a y-axis direction.

As shown in FIG. 1, the continuously variable transmission 10 is a V-belt type continuously variable transmission for example and includes a pulley shaft 12 formed at one end of a crankshaft 11, a drive pulley 20 supported by the pulley shaft 12, a driven pulley (not shown), and a V-belt 22 wound around the drive pulley 20 and the driven pulley in a transmission case 28.

The drive pulley 20 is composed of a fixed sheave 15 fixed to the pulley shaft 12 and a movable sheave 21 supported by the pulley shaft 12 and movable with respect to the fixed sheave 15 and the V-belt 22 is provided to be wound around between the both sheaves 15 and 21.

A ramp plate 13 is fixed to the pulley shaft 12 behind the movable sheave 21, and a plurality of centrifugal weights 19 are held between the movable sheave 21 and the ramp plate 13. When the pulley shaft 12 rotates and a centrifugal force corresponding to the rotational speed acts on the centrifugal weights 19, the centrifugal weights 19 move radially outward along a cam face 17 of the movable sheave 21, and the movable sheave 21 is moved toward the fixed sheave 15 side (see FIG. 2). As a result, the distance between the fixed sheave 15 and the movable sheave 21 reduces and the winding radius of the V-belt 22 increases.

The sliding surface for the V-belt 22 and the cam face 17 of the movable sheave 21 are formed as separate components, and an arm 26 is connected to a boss 23 located between the both surfaces via a bearing 24. Further, an output rod of an actuator 30 for moving the movable sheave 21 in cooperation with the centrifugal weights 19 is connected to the tip of the arm 26.

The actuator 30 connects a motor 32 as a drive source to the main body, and the main body includes inside, a reduction gear group for reducing the output of the motor 32 and a nut member rotationally driven by the motor 32 via the reduction gear group.

The actuator 30 has the output rod 46 that protrudes from the main body by driving of the motor 32. A U-shaped groove to which the arm 26 is connected is provided at a tip of the output rod 46. Further, the output rod 46 is supported by a bearing disposed on the main body of the actuator 30.

When the output rod 46 moves, the arm 26 also moves integrally with the output rod 46 and moves the movable sheave 21 with respect to the fixed sheave 15. As a result, the distance between the fixed sheave 15 and the movable sheave 21, that is, the winding radius of the V-belt 22 changes.

That is, as shown in FIG. 1, when the output rod 46 moves to the right, the distance between the fixed sheave 15 and the movable sheave 21 increases, and the winding radius of the V-belt 22 reduces. On the other hand, as shown in FIG. 2, when the output rod 46 moves to the left, the distance between the fixed sheave 15 and the movable sheave 21 reduces, and the winding radius of the V-belt 22 increases. The displacement amount of the movable sheave 21 is assumed to be about several tens of millimeters (15 mm for example).

The motor 32 is controlled by a control unit (not shown). The control by the control unit is performed based on the displacement amount of the movable sheave 21 detected by a sensor 60. That is, the movement of the movable sheave 21 is controlled by using the displacement amount of the movable sheave 21 as feedback information.

The sensor 60 is inserted into a hole provided on the transmission case 28 and detects the position of a concave portion 210 provided on a circumferential surface 211 of the movable sheave 21 over the whole circumference. The concave portion 210 and the sensor 60 are provided so that the left end of the concave portion 210 substantially coincides with the detecting position of the sensor 60 in a state where the distance between the fixed sheave 15 and the movable sheave 21 is large as shown in FIG. 1, and so that the right end of the concave portion 210 substantially coincides with the detecting position of the sensor 60 in a state where the distance between the fixed sheave 15 and the movable sheave 21 is small as shown in FIG. 2.

The movable sheave 21 is formed of a general magnetic material, for example, a material such as iron. It should be noted that the sensor 60 may be installed without the hole when the transmission case 28 is made of a non-magnetic material such as stainless steel, aluminum, brass.

Figure 3:
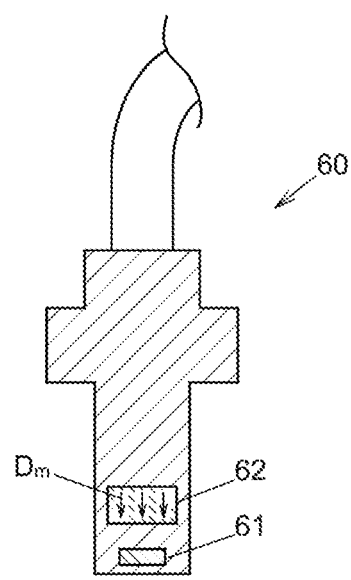
FIG. 3 is a partial cross-sectional view showing a configuration of a sensor.

FIG. 3 is a partial cross-sectional view showing a configuration of the sensor 60.

The sensor 60 is formed by molding a Hall IC 61 and a magnet 62 into a cylindrical shape using a synthetic resin or the like for example. The Hall IC 61 is disposed in the magnetic field of the magnet 62 and detects the x component and the z component of the magnetic field which changes in accordance with the displacement of the concave portion 210 (see FIGS. 1 and 2).

The magnet 62 is a permanent magnet formed using a material such as ferrite, samarium cobalt, neodymium, and the magnetization direction Dm is the z direction.

Figure 4A:
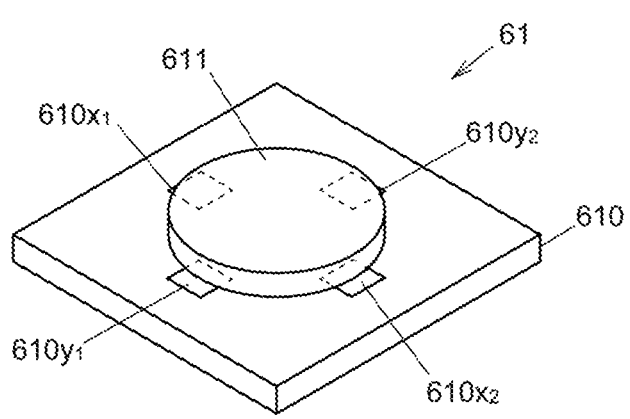
FIG. 4A is a perspective view showing a configuration of a Hall IC.
Figure 4B:
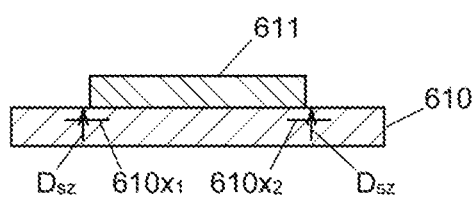
FIG. 4B is a cross-sectional view showing the configuration of the Hall IC.

FIGS. 4A and 4B area perspective view and a cross-sectional view showing the configuration of the Hall IC.

As shown in FIGS. 4A and 4B, the Hall IC 61 detects magnetic flux density in the x, y and z directions by having, for example, a flat plate-shaped substrate 610 having a thickness in the z direction; Hall elements $610x_1$, $610x_2$, $610y_1$ and $610y_2$ which are provided on the substrate 610, each of which has a detection surface parallel to the xy plane, and whose detecting direction $D_{sz}$ is the z direction as magnetic detection elements; a magnetic concentrator 611 that is provided so as to partially overlap the Hall elements $610x_1$, $610x_2$, $610y_1$ and $610y_2$, and that converts the magnetic flux in the x direction or the y direction into that in the z direction, and then that allows the Hall elements $610x_1$, $610x_2$, $610y_1$ and $610y_2$ to detect the magnetic flux; and a signal processing circuit (not shown) for processing signals output from the Hall elements $610x_1$, $610x_2$, $610y1$ and $610y_2$.

The Hall IC 61 can obtain output proportional to the magnetic flux density in the x direction and the y direction by acquiring the difference between the output values of the Hall elements $610x_1$ and $610x_2$ and the difference between the output values of the Hall elements $610y_1$ and $610y_2$ by using a triaxial position sensor manufactured by Melexis or the like for example. The relationship between the magnetic flux density and the output will be described later. The distance between the Hall elements $610x_1$ and $610x_2$ and the distance between the Hall elements $610y_1$ and $610y_2$ are 0.2 mm, the thickness of the package mold part in the z direction is 1.5 mm, the width in the x direction is 4.1 mm, and the height in the y direction is 3 mm. Permalloy can be used as the magnetic concentrator 611 of the sensor 60. Further, in the sensor 60, the Hall elements $610y_1$ and $610y_2$ may be omitted.

As long as the detecting directions are the x, y and z directions, another type of element such as an MR element may be used instead of the Hall IC 61, and when the detecting directions include the x, y and z directions, a multi-axis magnetic detection IC in which a magnetic detection element is arranged in each of the plurality of axial directions may be used.

(Operation of Displacement Detection Device)

Next, the action of the embodiment will be described with reference to FIGS. 1 to 8.

Figure 5A:
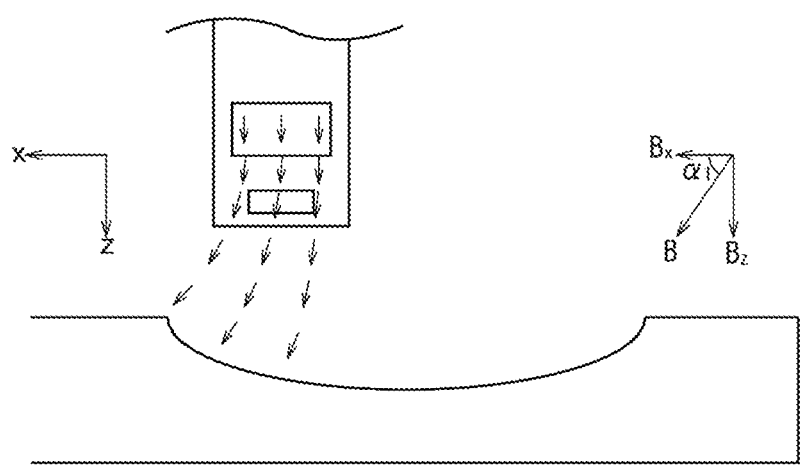
FIG. 5A is a schematic diagram for illustrating an operation of the displacement detection device.
Figure 5B:
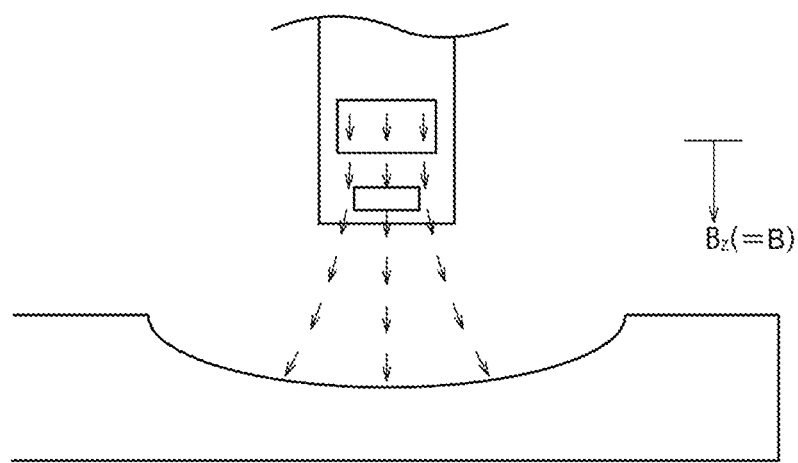
FIG. 5B is a schematic diagram for illustrating the operation of the displacement detection device.
Figure 5C:
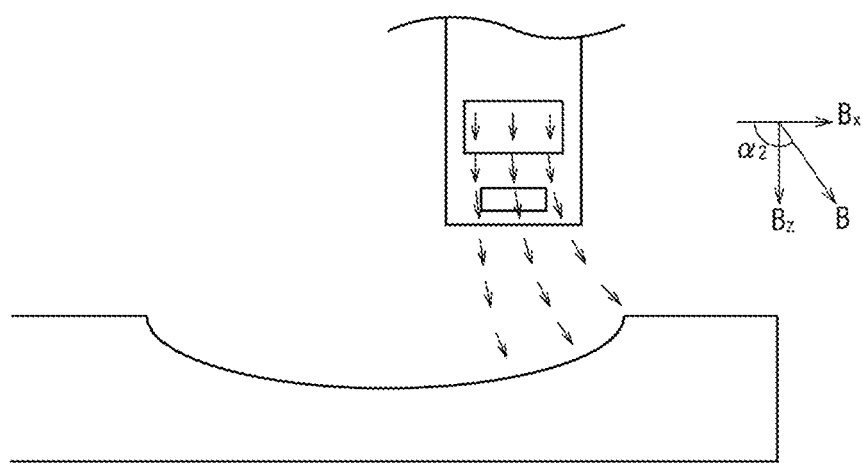
FIG. 5C is a schematic diagram for illustrating the operation of the displacement detection device.

FIGS. 5A to 5C are schematic diagrams for illustrating the operation of the displacement detection device.

As shown in FIG. 5A, in a state where the movable sheave 21 has not moved in the x direction (x=0), that is, in a state where the movable sheave 21 and the fixed sheave 15 are farthest apart from each other, the magnetic flux induced to the concave portion 210 of the movable sheave 21 from the magnet 62 flows as shown by the arrows in the figure, the x component $B_x=B\cos\alpha_1$ of the magnetic flux density detected by the Hall IC 61 is largest within the moving range of the movable sheave 21. Further, the z component $B_z=B\sin\alpha_1$ is smallest.

Next, as shown in FIG. 5B, in a state where the movable sheave 21 has moved to the intermediate point in the x direction (x=½$x_s$), a symmetric magnetic field is formed in the z-axis direction and the x component of the magnetic flux density detected by the Hall IC 61 is zero. Furthermore, the z component $B_z=B$ is largest within the moving range of the movable sheave 21.

Further, as shown in FIG. 5C, in a state where the movable sheave 21 has moved farthest away in the x direction (x=$x_s$), that is, in a state where the movable sheave 21 and the fixed sheave 15 are closest to each other, magnetic flux induced from the magnet 62 to the concave portion 210 of the movable sheave 21 flows as indicated by arrows in the figure, and the x component $B_x=B\cos\alpha_2=-B\cos\alpha_1$ of the magnetic flux density detected by the Hall IC 61 is maximized in the negative direction within the moving range of the movable sheave 21. In addition, the z component $B_z=B\sin\alpha_2=B\sin\alpha_1$ is smallest.

As described above, the magnetic flux density detected by the Hall IC 61 is graphically shown in FIGS. 6 and 7 below.

Figure 6:
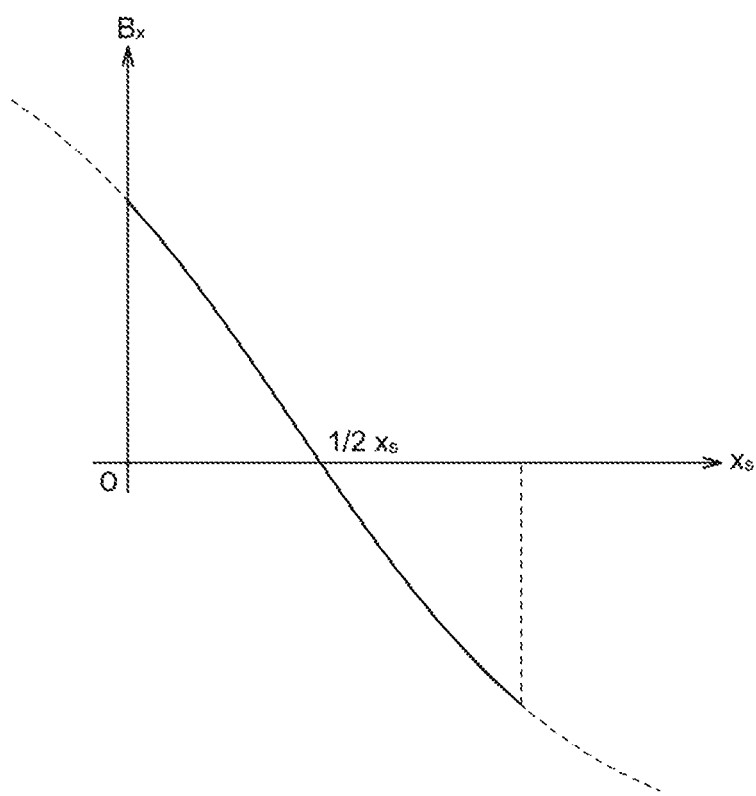
FIG. 6 is a graph showing an x component of a magnetic field detected by the Hall IC relative to a displacement amount of the movable sheave.

FIG. 6 is a graph showing the x component of the magnetic field detected by the Hall IC 61 with respect to the displacement amount of the movable sheave 21.

The x component of the magnetic flux density detected by the Hall IC 61 is $B_x=B\cos\alpha$, and thus, $B_x$ becomes maximum when the displacement amount of the movable sheave 21 is zero, $B_x$ becomes zero at the intermediate point of the displacement amount (x=½$x_s$), and $B_x$ becomes minimum at the point of the maximum displacement amount (x=$x_s$).

Figure 7:
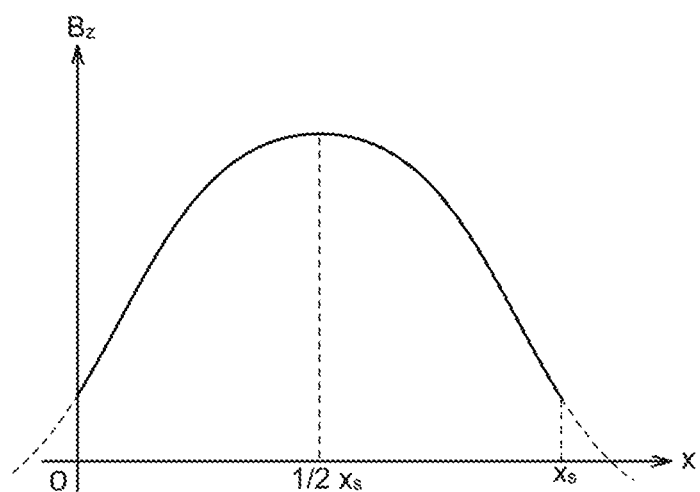
FIG. 7 is a graph showing a z component of the magnetic field detected by the Hall IC relative to the displacement amount of the movable sheave.

FIG. 7 is a graph showing the z component of the magnetic field detected by the Hall IC 61 with respect to the displacement amount of the movable sheave 21.

The z component of the magnetic flux density detected by the Hall IC 61 is $B_z=B\sin\alpha$, and thus, $B_z$ becomes minimum when the displacement amount of the movable sheave 21 is zero, $B_z$ becomes maximum at the intermediate point of the displacement amount (x=½$x_s$), and $B_z$ becomes minimum again at the point of the maximum displacement amount (x=$x_s$).

Figure 8:
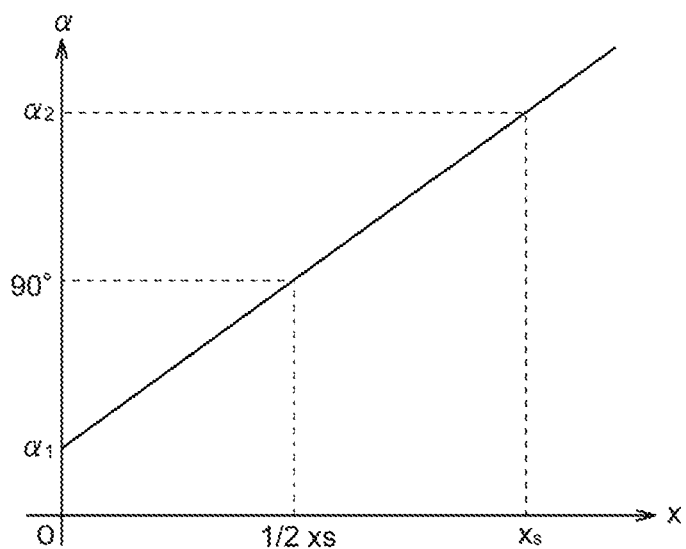
FIG. 8 is a graph showing an output of the sensor relative to the displacement amount of the movable sheave.

FIG. 8 is a graph showing the output of the sensor 60 with respect to the displacement amount of the movable sheave 21.

The sensor 60 calculates arctan ($B_z/B_x$) from the x component $B_x$ and the z component $B_z$ of the abovementioned magnetic flux density, calculates an angle α formed by the direction of the magnetic flux and the x axis, and outputs a voltage $V_{out}$ proportional to the angle α.

(Effect of Embodiment)

According to the first embodiment described above, the concave portion 210 is formed on the circumferential surface 211 of the movable sheave 21 that is the measuring object, and the magnetic flux induced to the concave portion 210 from the magnet 62 is detected by the sensor 60, and thus, the position of the movable sheave 21 is directly detected without contact.

In the above embodiment, the Hall IC 61 detects the magnetic flux density in the x direction and the z direction, but may detect the position of the movable sheave 21 from the magnetic flux density detected only in the x direction or only in the z direction. In the case of detecting the magnetic flux density only in the x direction, a Hall IC can be used in which two Hall elements are arranged in the x direction at the center of the substrate and two magnetic concentrators are arranged outside the Hall elements.

[Other Embodiments]

It should be noted that the present invention is not limited to the above embodiment, and various modifications are possible without departing from the spirit of the present invention. For example, modifications as shown in the following modification examples are possible, and these may be combined with each other.

(Modification 1)

Figure 9:
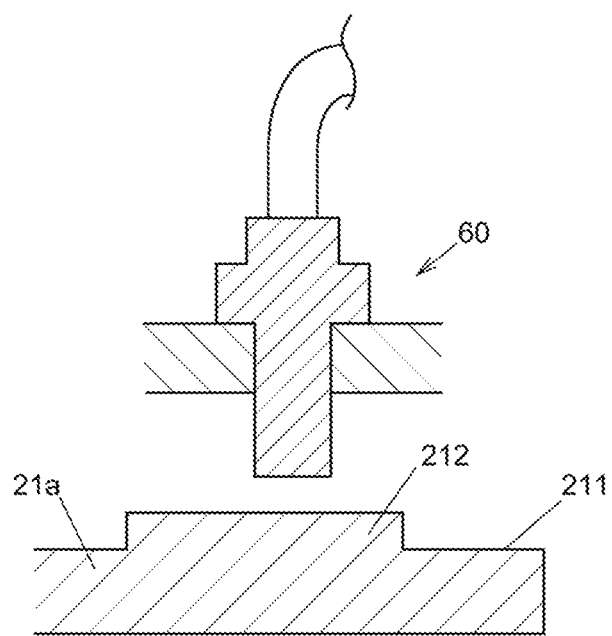
FIG. 9 is a cross-sectional view showing a modification example of the configuration of the movable sheave.

FIG. 9 is a cross-sectional view showing a modification example of the configuration of the movable sheave.

As the measuring object of the sensor 60, a movable sheave 21a having a protrusion 212 on the circumferential surface 211 may be used. The protrusion 212 may have a dome shape which is a shape of an inverted concave portion 210, in addition to a shape whose end portion forms a right angle in the cross section as shown in FIG. 9. Further, the protrusion 212 may be configured as a separate component from the movable sheave 21a. In addition, in the case of forming the concave portion, the periphery of the concave portion may be formed as a separate component.

(Modification 2)

Figure 10:
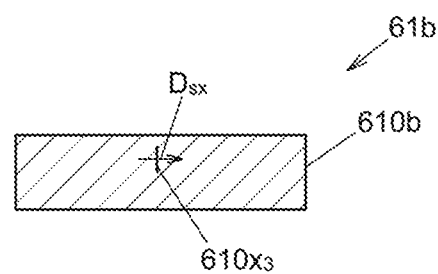
FIG. 10 is a cross-sectional view showing a modification example of the configuration of the Hall IC.

FIG. 10 is a cross-sectional view showing a modification example of the configuration of the Hall IC.

In the case of detecting the magnetic flux density only in the x direction, a Hall IC 61b in which the Hall element 610$x_3$ is disposed perpendicularly to the substrate surface of a substrate 610b may be used as the Hall IC to be used for the sensor 60 so that the detecting direction $D_{sx}$ is arranged in the x direction.

(Modification 3)

FIG. 11 is a cross-sectional view showing a modification example of the configuration of the displacement detection device.

In the case of detecting the magnetic flux density in the x direction, a sensor 60a may be used in which a Hall IC 61a whose detecting direction $D_{sx}$ is the normal direction of the substrate surface is used and the normal direction of the substrate surface of the Hall IC 61a is arranged in the x direction so that the detecting direction $D_{sx}$ coincides with the x direction.

In the case of using the sensor 60a, the sensitivity of magnetic detection can be improved by disposing the bottom surface of the sensor 60a closer to the axis of the movable sheave 21 than the circumferential surface 211.

In the above embodiment, the displacement detection device is used for a continuously variable transmission. However, without limiting to the continuously variable transmission, the displacement detection device can be similarly used for any measuring object having a circumferential surface. The other devices include a motor shaft and the like. In any case, displacement can be detected without contact. Furthermore, the measuring object may not necessarily be rotated. In this case, it is not necessary to provide the concave portion or the protrusion over the entire circumference.

Further, the combination of the sensor and the magnet of the above-described embodiment is an example, and these may be used by being appropriately selected and changed to new combinations as long as the function of positional detection is not impaired and the gist of the present invention is not changed.

INDUSTRIAL APPLICABILITY

A displacement detection device and a continuously variable transmission for directly detecting the position of a movable sheave are provided.

REFERENCE SIGNS LIST

10 continuously variable transmission
11 crankshaft
12 pulley shaft
13 ramp plate
15 fixed sheave
17 cam face
19 centrifugal weight
20 drive pulley
21 movable sheave
22 belt
23 boss
24 bearing
26 arm
28 transmission case
30 actuator
32 motor
46 output rod
54 tip
55 groove
60 sensor
61 Hall IC
62 magnet
210 concave portion
211 circumferential surface
212 protrusion
610 substrate
611 magnetic concentrator

The invention claimed is:

1. A continuously variable transmission and displacement detection system, comprising:
    a magnet that forms a magnetic field;
    an object to be measured configured to rotate around a rotation axis direction and displace along the rotation axis direction, the object having a concave portion or a convex portion in a circumferential surface, and both ends of the concave portion or the convex portion are continuously formed in a same plane with the circumferential surface; and
    a sensor disposed between the magnet and the circumferential surface of the object configured to output signals that are proportional to the temporal magnetic flux density in the rotation axis direction and a direction perpendicular to the circumferential surface of the object in a predetermined time, calculate an angle between a magnetic flux in the rotation axis direction and a magnetic flux in the direction perpendicular to the circumferential surface of the object, thereby detect changes in a magnetic flux density by a displacement of the object in the rotation axis direction of the object in a magnetic field formed by the magnet and induced to the concave portion or the convex portion of the object.

2. The continuously variable transmission and displacement detection system according to claim 1,
    wherein a width of the concave portion or the convex portion in the rotation axis direction is approximately the same as a displacement amount, the concave portion or the convex portion has symmetrical shape as to a plane passing through a midpoint of a displacement amount whose normal vector is parallel to the rotation axis direction.

3. A continuously variable transmission and displacement detection system, comprising:
    a magnet that forms a magnetic field;
    a movable sheave configured to rotate and displace in a rotation axis direction having a concave portion or a convex portion in a circumferential surface, and both ends of the concave portion or the convex portion are continuously formed in a same plane with the circumferential surface in the rotation axis direction; and
    a sensor disposed between the magnet and the circumferential surface of the moveable sheave and configured to output signals that are proportional to the temporal magnetic flux density in the rotation axis direction and a direction perpendicular to the circumferential surface of the object in a predetermined time, calculate an angle between a magnetic flux in the rotation axis direction and a magnetic flux in the direction perpendicular to the circumferential surface of the object, thereby detect changes in a magnetic flux density by a displacement of the moveable sheave in the rotation axis direction of the moveable sheave, in a magnetic field formed by the magnet and induced to the concave portion or the convex portion.

4. A continuously variable transmission and displacement detection system, comprising:
- a magnet that forms a magnetic field; and
- a sensor disposed between the magnet and a concave portion or a convex portion formed on a circumferential surface of an object to be measured that is rotatable around a rotation axis direction and is configured to displace along the rotation axis direction, wherein
- a first end and a second end of the concave portion or the convex portion are continuously formed in a same plane with the circumferential surface in the rotation axis direction;
- the sensor is configured to output signals that are proportional to the temporal magnetic flux density in the rotation axis direction and a direction perpendicular to the circumferential surface of the object in a predetermined time, calculate an angle between a magnetic flux in the rotation axis direction and a magnetic flux in the direction perpendicular to the circumferential surface of the object, thereby detect changes in a magnetic flux density by a displacement of the object in the rotation axis direction of the object, in a magnetic field formed by the magnet and induced to the concave portion or the convex portion of the object, and
- the sensor is configured to detect the first end and the second end of the concave portion or the convex portion in the rotation axis direction as a first detection position and a second detecting position of the sensor corresponding to a maximum or minimum distance between the object and a fixed object apart from the object.

* * * * *